Jan. 16, 1962 W. H. WEIR 3,017,169
WORKPIECE HOLDING APPARATUS
Filed Oct. 6, 1958
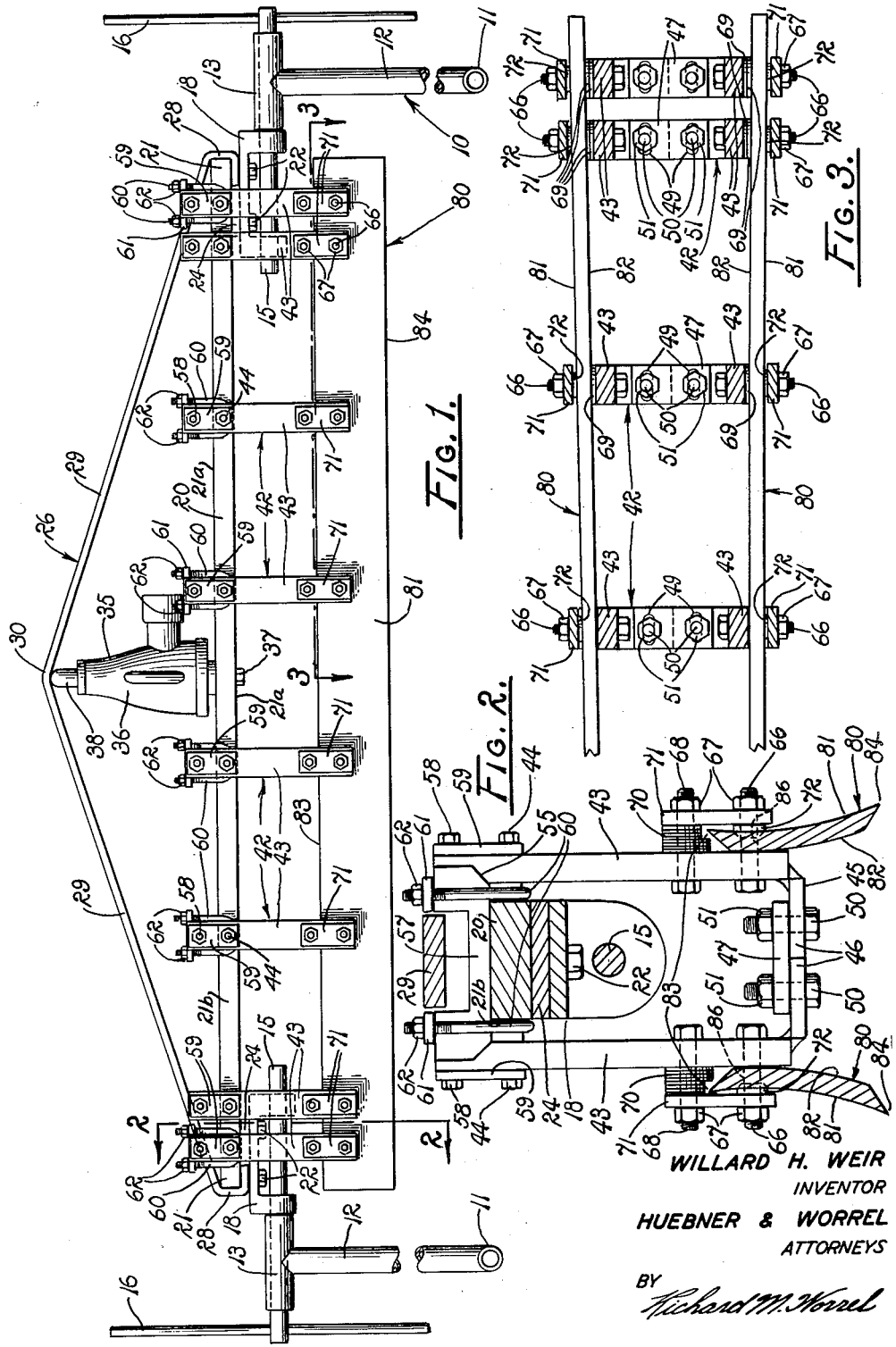
WILLARD H. WEIR
INVENTOR
HUEBNER & WORREL
ATTORNEYS
BY
Richard M. Worrel

United States Patent Office 3,017,169
Patented Jan. 16, 1962

3,017,169
WORKPIECE HOLDING APPARATUS
Willard H. Weir, 5758 S. Elm, Fresno, Calif.
Filed Oct. 6, 1958, Ser. No. 765,459
6 Claims. (Cl. 266—5)

The present invention relates to an apparatus for holding an elongated workpiece against distortion while being treated or repaired in a manner requiring the application of heat and more particularly to a jig for holding a scraper blade or the like against distortion while being face hardened.

It is well recognized that various workpieces must be face hardened for the purposes of resisting wear. For example, the lower edges of scraper blades used in road surfacing equipment are hardened by the welded application of wear resistant alloys to the surfaces thereof. It has been found that when the cutting edges of these relatively rigid blades are heated sufficiently to apply the re-surfacing or re-edging material, the blades bend or curve in two directions; namely, transversely away from the heated edge in a plane substantially normal to the blade, and secondly, upwardly from the lower knife-edge of the blade substantially in the plane of the blade. Of greater significance, however, is the fact that when such a blade cools subsequent to such heating, it contracts in directions opposite to those noted by amounts greater than that caused by heating. The result is that the blade is permanently distorted when the hardening operations have been completed in the absence of adequate resistance to such distortion.

The subject invention is concerned with the problem of holding such a blade, or other workpiece, in a predetermined position during hard facing thereof, or other operation involving the application of heat, so as to resist the tendency of the blade to distort.

In the past, apparatus has been known for placing elongated bars under initial curvature during heating and cooling, such as in a cambering process. To the extent known, the apparatus of the prior art has consisted of pairs of curved templates, or the like, between which the workpiece is placed, thence curved in the desired shape, and held in such condition during the various treatments. This type of apparatus is unsatisfactory for the problems here involved since it provides for preliminary curvature of the workpiece in only one plane and also since it does not permit surfacing operations to be performed on the workpiece while held in predetermined distortion-resisting position.

Accordingly, it is an object of the present invention to provide an improved workpiece holding apparatus for use in resisting distortion incident to the application of heat.

Another object is to provide a jig for holding scraper blades and the like while performing surfacing operations and so as to resist changes in the curvature of the workpiece during such operations.

Another object is to provide a jig for placing an elongated workpiece under forces which, during uneven heating thereof, are conductive to the ultimate attainment of a predetermined form of the workpiece.

Another object is to minimize distortion of an elongated earthworking blade as a result of the welded application of a face hardening material.

Another object is to provide a jig adapted concurrently to hold a pair of workpieces at the same time and in opposed relation so that the blades tend to counterbalance each other in their application of forces on the jig.

Another object is to provide a jig of the nature described which minimizes heat absorption from workpieces held thereby, so as to avoid jig distortion.

Another object is to provide such a workpiece holding jig which is easy to operate, dependable in action, durable in form, and highly effective in carrying out its intended purposes.

These, together with other objects, will become more fully apparent upon reference to the following description.

In the drawing:

FIG. 1 is a fragmentary side elevation of a workpiece holding apparatus embodying the principles of the present invention.

FIG. 2 is a somewhat enlarged transverse cross section taken on line 2—2 of FIG. 1.

FIG. 3 is a somewhat enlarged fragmentary horizontal section taken on line 3—3 of FIG. 1.

Referring more particularly to the drawings, a pair of stands 10 is fragmentarily illustrated in FIG. 1 and each stand includes a base 11 adapted to be supported on a floor, the ground, or the like, not shown; an elongated leg 12 rigidly connected to the base and upwardly extended therefrom; and a sleeve 13 transversely rigidly connected to the upper end of the leg. The stands are positioned so that the sleeves are in coaxial alignment with each other. Elongated shafts 15 are individually journaled in the sleeves 13, and handles 16 are transversely connected to outer ends of the shafts for rotating the same in the sleeves. U-shaped yokes 18 are rigidly connected to the inner end portions of the legs inwardly of the sleeves.

An elongated substantially rectangular beam 20 having opposite end portions 21, upper and lower surfaces 21a, and front and rear faces 21b is mounted on the stands 10. Specifically, the opposite end portions of the beam are rigidly connected by bolts 22 to the yokes 18. Preferably, spacers 24 are interposed the lower surface of the beam and the yokes and have the bolts passed therethrough. The beam has a longitudinal dimension between the opposite end portions, a transverse dimension between the front and rear faces, and a thickness dimension between the upper and lower surfaces. These dimensions are in right-angular relation to each other. The beam is substantially rigid in the plane of its longitudinal and transverse dimension but somewhat resiliently flexible in the plane of the longitudinal and thickness dimensions of the beam.

A substantially triangular-shaped tensioning frame 26 includes a pair of opposite base hooks 28 connected to opposite end portions 21 of the beam 20 and elongated tensioning side members 29 convergently upwardly extended from the hooks to an apex 30 disposed substantially centrally of the beam. The tensioning frame is in a common plane with the beam and forms therewith a complete isosceles triangle. A pair of the bolts 22 is passed through the base hooks so that the tensioning frame is rigidly mounted on the yokes 18 along with the beam.

A hydraulic jack 35 includes a housing 36 connected centrally to the beam 20 by means of a jack bolt 37, and a piston rod 38 rigidly connected to the apex 30 of the tensioning frame 26. It will be evident that upon extension of the jack, the side members 29 are placed under tension and the beam 20 is given an upward curvature.

A plurality of blade hangers 42 are rigidly connected to the beam 20 in longitudinally spaced relation therealong, it being noted that there is a pair of relatively more closely adjacent hangers provided at the opposite end portions 21 of the beam. Each hanger includes a pair of side arms 43 on opposite sides of the beam and downwardly, or transversely outwardly, extended in substantially right-angular relation from the beam. Mounting bolts 44 extend through the side arms into the side edges of the beam. Each hanger also includes a central portion 45 providing a pair of separable center flanges 46 in abutting relation and overlapped by a bridging pad 47. The pad has a pair of apertures 49 which are elongated longitudinally with respect to the beam, and hanger bolts 50 are passed upwardly through the flanges and the apertures to receive nuts 51 screw-threadably tightened downwardly against the bridging pad. In this manner the arms 43 of the hangers on opposite sides of the beam are maintained in a substantially common plane and with these two planes being in substantially parallel spaced relation to each other. However, the provision of the elongated apertures 49 allows for limited relative movement of the arms of each hanger longitudinally of the beam.

For more rigidly supporting the hangers 42 on the beam 20, the side arms 43 have upper inwardly disposed notches 55, and support blocks 57 extend transversely on the beam and provide opposite ends fitted in the notches of their respective side arms. The endmost blocks are centrally notched, as shown in FIG. 2, to accommodate the side members 29 of the tensioning frame 26. Bolts 58 are extended inwardly through the upper ends of the side arms and into the support blocks. Preferably, reinforcing pads 59 are positioned between the outwardly disposed surfaces of the arms and the respectively adjacent bolt heads. Inverted U-clamps 60 are fitted upwardly between opposite side edges of the beam and the arms 43 and provide legs embracing the support blocks 57. Plates 61 are fitted downwardly over the legs of the clamps in transverse relation to the support blocks, and nuts 62 are screw-threadably tightened downwardly on the legs against the plates.

A plurality of lower blade support bolts 66 are outwardly extended through lower ends of the side arms 43 and nuts 67 are screw-threaded on the outwardly extended ends of the support bolts. Further, a plurality of auxiliary bolts 68 are extended outwardly through the side arms in upwardly spaced relation to the support bolts and also have nuts 67 screw-threaded thereon. A plurality of spacer washers 69 circumscribe the support bolts between the outwardly disposed surfaces of the side arms 43 and the nuts on their respective bolts, as best seen in FIG. 3. A plurality of auxiliary washers 70 are provided on the auxiliary bolts outwardly of the side arms. Pressure plates 71 are fitted on respectively adjacent support and auxiliary bolts in substantially vertical positions inwardly of the nuts on the bolts but outwardly of the spacer and auxiliary washers. Further, a plurality of blade positioning washers 72 are individually fitted on the support bolts 66 inwardly of the pressure plates and these positioning washers are of generally frusto-conical, inwardly convergent, form.

Operation

The operation of the described embodiment of the subject invention is believed readily apparent and is briefly summarized at this point. In connection with explaining this operation, reference is conveniently made to a pair of elongated scraper blades 80 of the type employed in road surfacing equipment. These steel blades are transversely concavo-convex with their forward surfaces 81 being concave and their rearward surfaces 82 being convex. Each blade has an upper edge 83 and a lower ground engaging knife-edge 84. Frequently, both edges are sharpened and hardened so that either can be employed for scraping purposes. In addition, each blade is provided with a plurality of mounting holes 86 arranged in a longitudinal row in each blade relatively adjacent to the upper edges thereof. It is necessary in maintaining these blade that their cutting edges be as hard and wear resistant as possible. For this purpose, extremely hard alloys are applied by welding to said edges.

For such operation, the blades 80 are mounted in the jig of the subject invention. Specifically, the mounting holes 86 are the blades are fitted over the support bolts 66 between the spacing washers 69 and the positioning washers 72, as best seen in FIGS. 2 and 3. When mounted in this manner, the blades extend longitudinally of, and in spaced substantially parallel relation to the beam 20. Also, the lower edges 84 of the blades extend downwardly from the lower ends of the side arms 43. Further, the front concave surfaces 81 of the blades are disposed outwardly away from each other. The nuts 67 are tightened downwardly against the pressure plate 71 tightly to clamp the blades on their respective side arms 43. Because of the rigid connection of the hangers 42 to the beam 20, and the rigid connection of the blades to the hangers, the blades are in rigid association with the beam.

Two curvatures are initially placed in the blades 80. First, the blades are transversely curved in a plane substantially normal to the blades. For this purpose, the spacing washers 69 are provided. With particular reference to FIG. 3, it is to be noted that the bolts 66 associated with the central most hangers 42 are not provided with any spacing washer. Further, the number of spacing washers on the bolts is progressively increased outwardly from the center of the beam toward the opposite end portions 21 thereof. It will therefore be evident that by tightening the nuts 67, and remembering that the side arms 43 along each side of the beam are in a common plane, the blades are curved outwardly at opposite ends thereof with respect to their centers. This can be visualized by reference to FIG. 3.

Secondly, the blades 80 are curved transversely in their own planes. For this purpose, the jack 35 is expanded to impart a slight upward concavity to the beam 20 whereupon the blades are similarly upwardly curved through the medium of the hangers 42. The jack is illustrated in FIG. 1 as being in its innermost retracted position so that this curvature is not illustrated in the drawing.

Because of the described center flanges 46, the bridging pads 47, and the nuts and bolts 51 and 50, the blades 80 are maintained in fixed minimum spaced relation to each other. However, because of the elongated apertures 49, as best seen in FIG. 3, the blades are allowed to move in limited amounts longitudinally with respect to each other.

After the blades 80 have been mounted in the above described manner in the jig, the blades may be oriented in any desired position by rotating the shafts 15 by means of the handles 16 for working convenience. The outwardly disposed surfaces 81 of the blades 80 adjacent to their lower edges 84 then have the hard alloys welded thereto in the well-known manner, resulting in the heated expansion and subsequent contraction by cooling of the blades. It is found that after the surfacing operations have been completed, the blade returns to its initial position prior to being bent or curved in the jig and there is no distortion in the blade when the jig is properly adjusted.

It is to be noted that previous jigs for the purpose have largely failed properly to hold such scraper blades during surfacing operations because of the transmission of heat thereto which caused distortion of the jig itself so as to render proper blade shaping impossible. In this connection, it is particularly significant that the instant invention employs the blade hangers 42 which hold the blades in sufficiently spaced relation to the beam 20 and tensioning frame 26 so as to avoid any significant heat transfer.

From the foregoing it will be evident that a highly effective apparatus has been provided for holding an elongated workpiece, such as a scraper blade, in predetermined curved position during the performance of various surfacing operations on the workpiece. The apparatus holds the workpiece in the desired position while allowing the performance of the surfacing operations thereon. In addition, the apparatus is effective for curving the workpiece in two different planes so as to counteract and overcome any distortions which normally are incurred as a result of the surfacing treatments.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A jig for holding a pair of elongated substantially rectangular rigid earthworking blades in predetermined positions in opposed substantially parallel spaced relation to each other during treatment of the outwardly disposed surfaces of the blades involving the application of heat, for imparting predetermined transverse curvatures to the blades in two planes, and for maintaining such curvatures during and subsequent to such treatment comprising an elongated mounting beam having longitudinal, transverse and thickness dimensions in right-angular relation to each other, said beam having substantial rigidity in the plane of its longitudinal and transverse dimensions; means connected to the opposite end portions of the beam for supporting the beam in a work position; a plurality of U-shaped blade hangers rigidly connected to the beam in longitudinally spaced relation therealong, each of the hangers including a pair of side arms on opposite sides of the beam extended from the beam in substantially perpendicular relation to the plane of its longitudinal and transverse dimensions, and a central portion interconnecting the arms in predetermined spaced parallel relation to each other with the arms along each side of the beam in a substantially common plane parallel to the plane of the longitudinal and thickness dimensions of the beam; a plurality of blade support bolts individually extended through the ends of the arms and substantially perpendicularly outwardly therefrom; nuts screw-threaded on the bolts; spacing washers circumscribing the bolts outwardly of the hanger arms; a plurality of auxiliary bolts individually extended through and substantially perpendicularly outwardly from the hanger arms in individually inwardly spaced relation to their respectively adjacent support bolts; nuts screw-threaded on the auxiliary bolts; pressure plates individually slidably fitted on respectively adjacent support and auxiliary bolts inwardly of the nuts on such bolts; auxiliary washers circumscribing the auxiliary bolts between the arms and the pressure plates, the support bolts on each side of the beam being adapted to extend through the bolt holes of a pair of such earthworking blades so that the blades are between the spacing washers and the pressure plates and extend transversely of the arms and in transversely spaced substantially parallel relation to the beam, there being a progressively greater number of spacing washers on the bolts from the hangers centrally of the beam outwardly to the hangers adjacent to the opposite end portions of the beam, and the nuts being screw-threadably tightened on their respective bolts tightly to clamp the blades between the hangers and the nuts thereby transversely oppositely to bend the blades out of parallelism with the plane of the longitudinal and thickness dimensions of the beam and so that the outwardly disposed surfaces of the blades are concave between the opposite ends thereof.

2. A jig for holding an elongated, thin, substantially flat workpiece in predetermined stressed shape comprising an elongated beam having longitudinal, transverse, and thickness dimensions in right-angular relation to each other, said beam being substantially rigid in the plane of its longitudinal and transverse dimensions, the beam having opposite ends and a central portion intermediate said opposite ends; elongated blade hangers rigidly connected to the beam in longitudinally spaced relation therealong and transversely outwardly extended on a common side of the beam and in a substantially common plane; workpiece mounting bolts individually transversely extended through and outwardly of the hangers and in laterally spaced relation to the beam, said bolts being also extended in substantially normal relation to the plane of the longitudinal and thickness dimensions of the beam and being in spaced substantially parallel relation to each other; nuts screw-threadably connected to the bolts; and washers circumscribing some of the bolts between their respective hangers and nuts, the bolts being adapted to extend through such a workpiece with the workpiece positioned between the nuts and the washers and in laterally spaced relation to the beam, there being a progressively greater number of washers on the bolts from the central portion of the beam outwardly toward the opposite ends thereof, the nuts being screw-threadably tightened on their respective bolts tightly to clamp the workpiece between the hangers and the nuts thereby transversely to bend the workpiece in a plane parallel to the plane of the longitudinal and transverse dimension of the beam in accordance with the number and location of the washers.

3. The jig of claim 1 wherein the beam possesses limited flexibility in the plane of the longitudinal and thickness dimensions of the beam, said jig including a triangular tensioning frame having a pair of base hooks connected to opposite end portions of the beam, and angularly related side tensioning members convergently upwardly extended from the hooks in a common plane with the beam and meeting in an apex centrally of the beam; and a jack having opposite ends respectively bearing against the apex of the frame and the beam, the jack being expansible to tension the side members, to flex the beam, thereby to flex the blades transversely in the plane of said longitudinal and thickness dimensions.

4. The jig of claim 1 wherein the central portions of each hanger include separable flanges individually rigidly connected to the arms of such hanger; a bridging pad marginally overlapping the flanges having a pair of spaced apertures respectively over the flanges and longitudinally elongated with respect to the beam; bolts extended through the flanges and the apertures in the bridging pad; and nuts screw-threadably tightened on the bolts whereby the arms of the hangers are maintained in rigid transverse relation but whereby limiting relative longitudinal movement of the arms is permitted by said elongated apertures.

5. A jig for holding an elongated, thin, substantially flat workpiece in predetermined stressed shape comprising an elongated beam having longitudinal, transverse, and thickness dimensions in right-angular relation to each other, said beam being substantially rigid in the plane of its longitudinal and transverse dimensions, the beam having opposite ends and a central portion intermediate said opposite ends; blade hangers rigidly connected to the beam in longitudinally spaced relation therealong and transversely outwardly extended on a common side of the beam; workpiece mounting bolts transversely extended through and outwardly of the hangers and in laterally spaced relation to the beam, said bolts being also in spaced substantially parallel relation to each other; fasteners axially adjustably connected to the bolts; and washers circumscribing some of the bolts between their respective hangers and fasteners, the bolts being adapted to extend through such a workpiece with the workpiece positioned between the fasteners and the washers and in laterally spaced relation to the beam, there being different number of washers on the bolts longitudinally of the beam whereby when the fasteners are inwardly tightened on their respective bolts, the workpiece is tightly clamped between the hangers and the fasteners thereby transversely to bend the workpiece in accordance with the number and location of the washers.

6. In a jig for holding an elongated, thin, substantially flat workpiece in predetermined stressed shape wherein the workpiece has longitudinal, transverse, and thickness dimensions in right-angular relation to each other, a V-shaped tensioning frame including a pair of side arms convergently interconnected at an apex and having divergently extended end portions; an elongated substantially rigid workpiece mounting means rigidly interconnecting the opposite end portions of the side arms of the tensioning frame in opposed relation to the apex thereof, said mounting means having longitudinal, transverse, and thickness dimensions in right-angular relation to each other; workpiece mounting bolts transversely extended through and outwardly of the workpiece mounting means, said bolts being extended in substantially normal relation to the plane of the longitudinal and thickness dimensions of the workpiece mounting means and being in substantially parallel spaced relation to each other; nuts screw-threadably connected to the bolts; and washers circumscribing some of the bolts between their respective nuts and said workpiece mounting means, the bolts being adapted to extend through such a workpiece with the workpiece positioned between the nuts and the washers and in laterally spaced relation to the workpiece mounting means, there being a progressively greater number of washers on the bolts from a position opposite to said apex of the tensioning frame outwardly toward the opposite portions thereof, the nuts being screw-threadably tightened on their respective bolts tightly to clamp the workpiece between the workpiece mounting means and the nuts thereby transversely to bend the workpiece in a plane substantially parallel to the plane of the longitudinal and transverse dimensions of the workpiece mounting means in accordance with the number and location of the washers.

References Cited in the file of this patent

UNITED STATES PATENTS

| | | |
|---|---|---|
| Re. 4,829 | Ray | Mar. 26, 1872 |
| 1,206,137 | Patterson | Nov. 28, 1916 |
| 1,520,373 | Taylor | Dec. 23, 1924 |
| 2,352,028 | Somes | June 20, 1944 |
| 2,659,332 | Wiese | Nov. 17, 1953 |
| 2,839,289 | Holscher | June 17, 1958 |